United States Patent
Brinkdopke et al.

(10) Patent No.: US 8,398,041 B2
(45) Date of Patent: Mar. 19, 2013

(54) MOUNTING BRACKET AND WALL MOUNTABLE MATERIAL DISPENSING SYSTEM

(75) Inventors: Andrew Dale Brinkdopke, Appleton, WI (US); Ryan Leslie Fulscher, Neenah, WI (US); Robert Samuel Schlaupitz, New London, WI (US); Christine Marie Cowell, Neenah, WI (US); David James Wilks, Appleton, WI (US); Elizabeth Oriel Bradley, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 601 days.

(21) Appl. No.: 12/569,303

(22) Filed: Sep. 29, 2009

(65) Prior Publication Data

US 2011/0024585 A1 Feb. 3, 2011

Related U.S. Application Data

(60) Provisional application No. 61/229,983, filed on Jul. 30, 2009.

(51) Int. Cl.
*A47G 1/10* (2006.01)
(52) U.S. Cl. .................. 248/316.7; 248/316.1
(58) Field of Classification Search ............ 248/905, 248/310, 205.3, 205.4, 316.1, 316.7, 225.51; D6/513, 515; 206/231, 223, 732
See application file for complete search history.

(56) References Cited

U.S. PATENT DOCUMENTS 2,025,732 A 12/1935 Dodelin
2,461,177 A * 2/1949 Prestien .................. 312/244
(Continued)

FOREIGN PATENT DOCUMENTS

DE 297 19 026 U1 3/1998
EP 0 122 809 A1 10/1984
(Continued)

OTHER PUBLICATIONS

American Society for Testing Materials (ASTM) Designation: B 395-95, "Standard Specification for U-Bend Seamless Copper and Copper Alloy Heat Exchanger and Condenser Tubes," pp. 535-543, published Oct. 1995.

(Continued)

*Primary Examiner* — Gwendolyn Baxter
(74) *Attorney, Agent, or Firm* — H. Michael Kubicki

(57) ABSTRACT

Generally, a mounting bracket for mounting a mountable object is disclosed. The mounting bracket includes a baseplate has a substantially flat mounting surface and an opposite outward-facing surface. A ledge extends a first distance from the outward-facing surface to support the mountable object. A mounting bracket locking component adapted to frictionally engage a mountable object locks the mountable object in place. Additionally, a stabilizing member extending a second distance from the outward-facing surface contacts the mountable object to help limit movement of the object during use. The mounting bracket may be used with a material dispenser in a wall mountable material dispensing system. The wall mountable material dispensing system may be packaged as a kit wherein the mounting bracket is packaged within the material dispenser.

16 Claims, 5 Drawing Sheets

U.S. PATENT DOCUMENTS

| | | | |
|---|---|---|---|
| 2,685,365 A | 8/1954 | Sieven | |
| 3,086,724 A | 4/1963 | Powell | |
| 3,251,571 A | 5/1966 | Ernest | |
| 3,297,265 A | 1/1967 | Turro | |
| 3,794,253 A | 2/1974 | Megdall | |
| 3,824,953 A | 7/1974 | Boone | |
| 3,830,198 A | 8/1974 | Boone | |
| 3,837,595 A | 9/1974 | Boone | |
| 3,943,859 A | 3/1976 | Boone | |
| 3,979,094 A | 9/1976 | DeWitt | |
| 4,004,687 A | 1/1977 | Boone | |
| 4,101,026 A | 7/1978 | Bonk | |
| 4,106,616 A | 8/1978 | Boone | |
| 4,106,617 A | 8/1978 | Boone | |
| D252,842 S | 9/1979 | McKee | |
| 4,235,333 A | 11/1980 | Boone | |
| 4,235,350 A | 11/1980 | Valentino | |
| D259,682 S | 6/1981 | Standing | |
| 4,309,019 A | 1/1982 | Bloom | |
| 4,385,733 A | 5/1983 | O'Keefe | |
| 4,425,012 A | 1/1984 | Kley | |
| 4,427,159 A | 1/1984 | Miller et al. | |
| 4,532,833 A | 8/1985 | Downs | |
| 4,565,335 A | 1/1986 | Rankin | |
| 4,570,820 A | 2/1986 | Murphy | |
| 4,641,898 A | 2/1987 | Horowitz et al. | |
| 4,735,317 A | 4/1988 | Sussman et al. | |
| 4,834,316 A | 5/1989 | DeLorean | |
| 4,978,095 A | 12/1990 | Phillips | |
| 5,012,986 A | 5/1991 | Needle | |
| D318,770 S | 8/1991 | Grisel | |
| 5,123,566 A | 6/1992 | Lage et al. | |
| 5,192,044 A | 3/1993 | Baskin | |
| 5,242,057 A | 9/1993 | Cook et al. | |
| 5,255,800 A | 10/1993 | Kelly | |
| 5,311,986 A | 5/1994 | Putz | |
| D356,225 S | 3/1995 | Coggins et al. | |
| 5,439,521 A | 8/1995 | Rao | |
| 5,494,250 A * | 2/1996 | Chen | 248/316.7 |
| D377,284 S | 1/1997 | Farrow et al. | |
| 5,605,250 A | 2/1997 | Meiron et al. | |
| 5,618,008 A | 4/1997 | Dearwester et al. | |
| 5,638,966 A | 6/1997 | Kuntz | |
| 5,660,313 A | 8/1997 | Newbold | |
| 5,692,639 A | 12/1997 | Lahaussois et al. | |
| 5,697,577 A | 12/1997 | Ogden | |
| D393,387 S | 4/1998 | Gregor et al. | |
| D393,389 S | 4/1998 | Thurston et al. | |
| 5,765,717 A | 6/1998 | Gottselig | |
| D406,481 S | 3/1999 | Conrado | |
| 5,894,941 A * | 4/1999 | Woodruff | 211/41.12 |
| 5,897,074 A | 4/1999 | Marino | |
| 5,950,960 A | 9/1999 | Marino | |
| 5,980,931 A | 11/1999 | Fowler et al. | |
| D417,351 S | 12/1999 | Scavuzzo | |
| 6,047,920 A | 4/2000 | Dearwester et al. | |
| 6,056,235 A | 5/2000 | Brozinsky | |
| 6,121,165 A | 9/2000 | Mackey et al. | |
| 6,158,614 A | 12/2000 | Haines et al. | |
| 6,273,359 B1 | 8/2001 | Newman et al. | |
| 6,279,800 B1 | 8/2001 | Lee | |
| 6,279,865 B1 | 8/2001 | Newman et al. | |
| D452,094 S | 12/2001 | Akin | |
| 6,378,800 B1 | 4/2002 | Apichom | |
| 6,382,552 B1 | 5/2002 | Paul et al. | |
| 6,439,386 B1 | 8/2002 | Sauer et al. | |
| 6,446,808 B1 | 9/2002 | Paul et al. | |
| 6,460,799 B2 | 10/2002 | Ryan | |
| 6,497,345 B1 | 12/2002 | Wilker et al. | |
| 6,503,326 B1 | 1/2003 | Mikelionis | |
| 6,523,690 B1 | 2/2003 | Buck et al. | |
| 6,540,195 B2 | 4/2003 | Newman et al. | |
| 6,550,635 B1 | 4/2003 | King et al. | |
| 6,568,625 B2 | 5/2003 | Faulks et al. | |
| 6,572,063 B1 | 6/2003 | Gitelman et al. | |
| 6,585,130 B2 | 7/2003 | Turbett et al. | |
| 6,592,004 B2 | 7/2003 | Huang et al. | |
| 6,604,628 B1 | 8/2003 | Tanaka et al. | |
| D481,393 S | 10/2003 | Alo et al. | |
| D481,893 S | 11/2003 | Walther et al. | |
| 6,766,919 B2 | 7/2004 | Huang et al. | |
| 6,834,773 B2 | 12/2004 | Wu | |
| D506,632 S | 6/2005 | Holsclaw | |
| 6,929,148 B2 | 8/2005 | Haddad et al. | |
| 6,945,493 B1 | 9/2005 | Gottesman | |
| 6,976,605 B2 | 12/2005 | Mitchell et al. | |
| 6,997,342 B2 | 2/2006 | Mitchell et al. | |
| 7,040,502 B2 | 5/2006 | Phelps et al. | |
| 7,059,493 B2 | 6/2006 | Welchel et al. | |
| 7,128,235 B2 | 10/2006 | Haddad et al. | |
| 7,140,513 B2 | 11/2006 | Welchel et al. | |
| 7,147,129 B1 | 12/2006 | Menefield | |
| 7,185,865 B1 * | 3/2007 | Patrick | 248/318 |
| 7,207,461 B2 | 4/2007 | Mitchell et al. | |
| 7,228,968 B1 | 6/2007 | Burgess | |
| 7,252,209 B2 | 8/2007 | Julius | |
| D552,902 S | 10/2007 | Sadeh et al. | |
| 7,311,221 B2 | 12/2007 | Serfaty | |
| 7,357,350 B1 | 4/2008 | Rogers | |
| 7,410,052 B2 | 8/2008 | Cook et al. | |
| 7,430,886 B2 | 10/2008 | Zeusnik | |
| 7,481,395 B2 | 1/2009 | Rogers | |
| 7,527,218 B2 | 5/2009 | Brown | |
| 7,530,472 B2 | 5/2009 | Bitowft et al. | |
| 7,726,513 B2 | 6/2010 | Schlaupitz et al. | |
| 2002/0139811 A1 | 10/2002 | Tramontina et al. | |
| 2002/0162848 A1 | 11/2002 | Na | |
| 2004/0099623 A1 * | 5/2004 | Kurtz et al. | 211/85.17 |
| 2004/0135000 A1 | 7/2004 | Buthier | |
| 2005/0283980 A1 | 12/2005 | Bathard et al. | |
| 2006/0037230 A2 | 2/2006 | Oelerich, Jr. et al. | |
| 2006/0102508 A1 | 5/2006 | Decristofaro et al. | |
| 2006/0118567 A1 | 6/2006 | Linnebur | |
| 2006/0266761 A1 | 11/2006 | Rhea | |
| 2007/0012846 A1 | 1/2007 | Wan | |
| 2007/0045334 A1 | 3/2007 | Sherman et al. | |
| 2007/0166561 A1 | 7/2007 | Ziegler et al. | |
| 2007/0181594 A1 | 8/2007 | Thompson | |
| 2007/0215782 A1 | 9/2007 | Phung et al. | |
| 2007/0236053 A1 | 10/2007 | West et al. | |
| 2007/0261159 A1 | 11/2007 | Marks | |
| 2008/0053932 A1 * | 3/2008 | Newbould et al. | 211/88.01 |
| 2008/0067185 A1 | 3/2008 | Schlaupitz et al. | |
| 2008/0142536 A1 * | 6/2008 | Cohen et al. | 221/48 |
| 2008/0142542 A1 | 6/2008 | Petry | |
| 2008/0169411 A1 | 7/2008 | Quinn et al. | |

FOREIGN PATENT DOCUMENTS

| | | |
|---|---|---|
| EP | 0 822 773 B1 | 10/2002 |
| EP | 0 999 990 B1 | 9/2003 |
| EP | 1 352 601 A2 | 10/2003 |
| EP | 1 129 656 B1 | 12/2005 |
| EP | 1 707 092 A1 | 10/2006 |
| EP | 1 875 839 A1 | 1/2008 |
| EP | 1 989 982 A2 | 11/2008 |
| GB | 2 270 901 A | 3/1994 |
| GB | 2 357 076 A | 6/2001 |
| GB | 2 439 304 A | 12/2007 |
| GB | 2 439 538 A | 1/2008 |
| GB | 2 443 183 A | 4/2008 |
| JP | 2000-085782 A | 3/2000 |
| JP | 2003-070679 A | 3/2003 |
| JP | 2003-072765 A | 3/2003 |
| JP | 2003-072866 A | 3/2003 |
| JP | 2003-252339 A | 9/2003 |
| JP | 2005-104501 A | 4/2005 |
| WO | WO 88/01252 | 2/1988 |
| WO | WO 94/14365 A1 | 7/1994 |
| WO | WO 98/04486 A1 | 2/1998 |
| WO | WO 98/08763 A1 | 3/1998 |
| WO | WO 01/89935 A2 | 11/2001 |
| WO | WO 01/89937 A2 | 11/2001 |
| WO | WO 02/43546 A1 | 6/2002 |
| WO | WO 03/007770 A1 | 1/2003 |
| WO | WO 2004/038278 | 5/2004 |
| WO | WO 2004/103833 A1 | 12/2004 |
| WO | WO 2007/010475 A2 | 1/2007 |

| WO | WO 2007/044156 A1 | 4/2007 |
| WO | WO 2007/144558 A2 | 12/2007 |
| WO | WO 2007/148125 A2 | 12/2007 |

OTHER PUBLICATIONS

American Society for Testing Materials (ASTM) Designation: D 412-98a, "Standard Test Methods for Vulcanized Rubber and Thermoplastic Elastomers—Tension," pp. 43-55, published Aug. 1998.

American Society for Testing Materials (ASTM) Designation: D 792-98, "Standard Test Methods for Density and Specific Gravity (Relative Density) of Plastics by Displacement," pp. 159-163, published Nov. 1998.

American Society for Testing Materials (ASTM) Designation: D1894-01, "Standard Test Method for Static and Kinetic Coefficients of Friction of Plastic Film and Sheeting," pp. 16, published Jun. 2001.

American Society for Testing Materials (ASTM) Designation: D2240-97, "Standard Test Method for Rubber Property—Durometer Hardness," pp. 400-403, published Mar. 1997.

American Society for Testing Materials (ASTM) Designation: D6125-97, "Standard Test Method for Bending Resistance of Paper and Paperboard (Gurley Type Tester)," pp. 885-889, published Feb. 1998.

English language machine translation of JP 2003-072765 A.

* cited by examiner

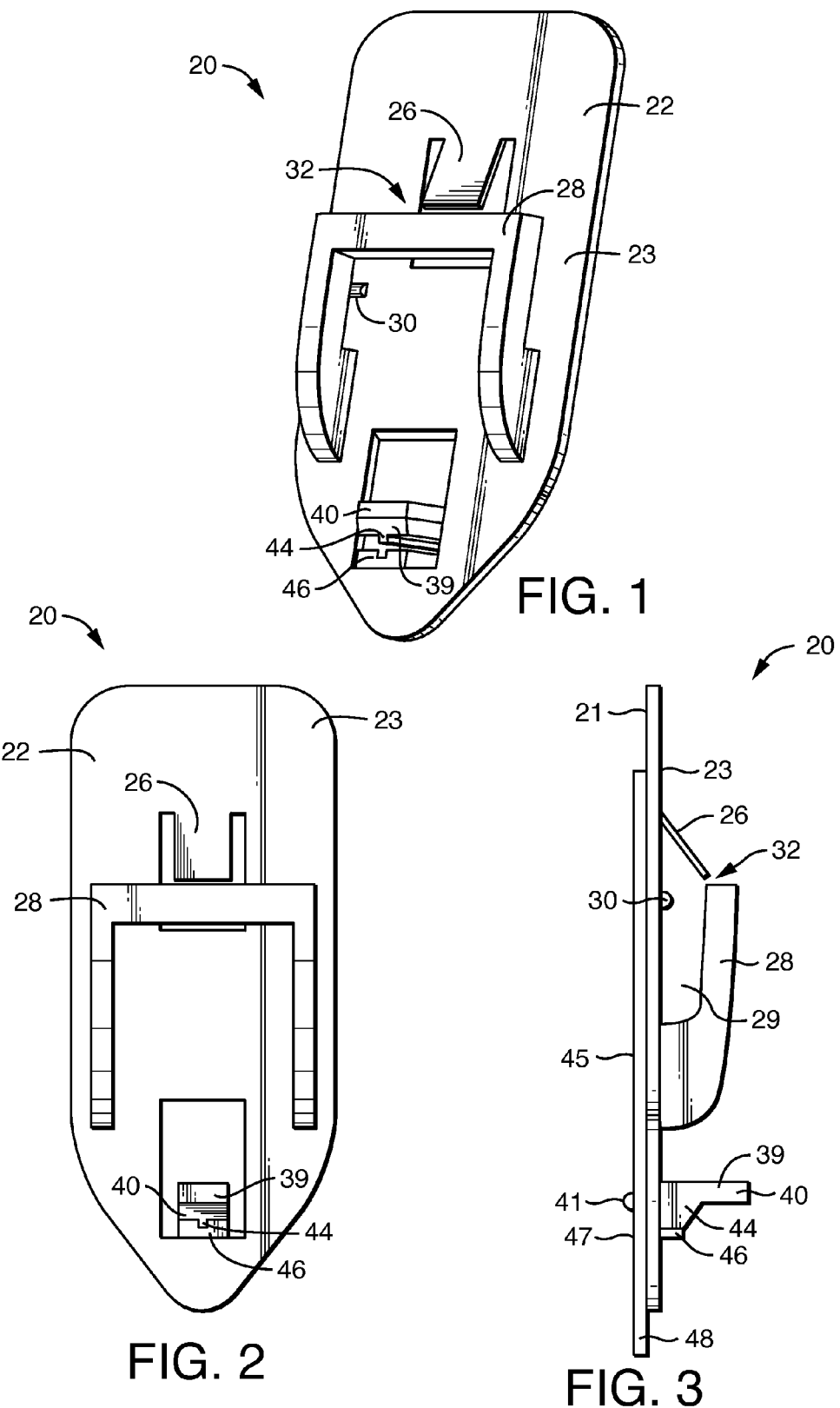

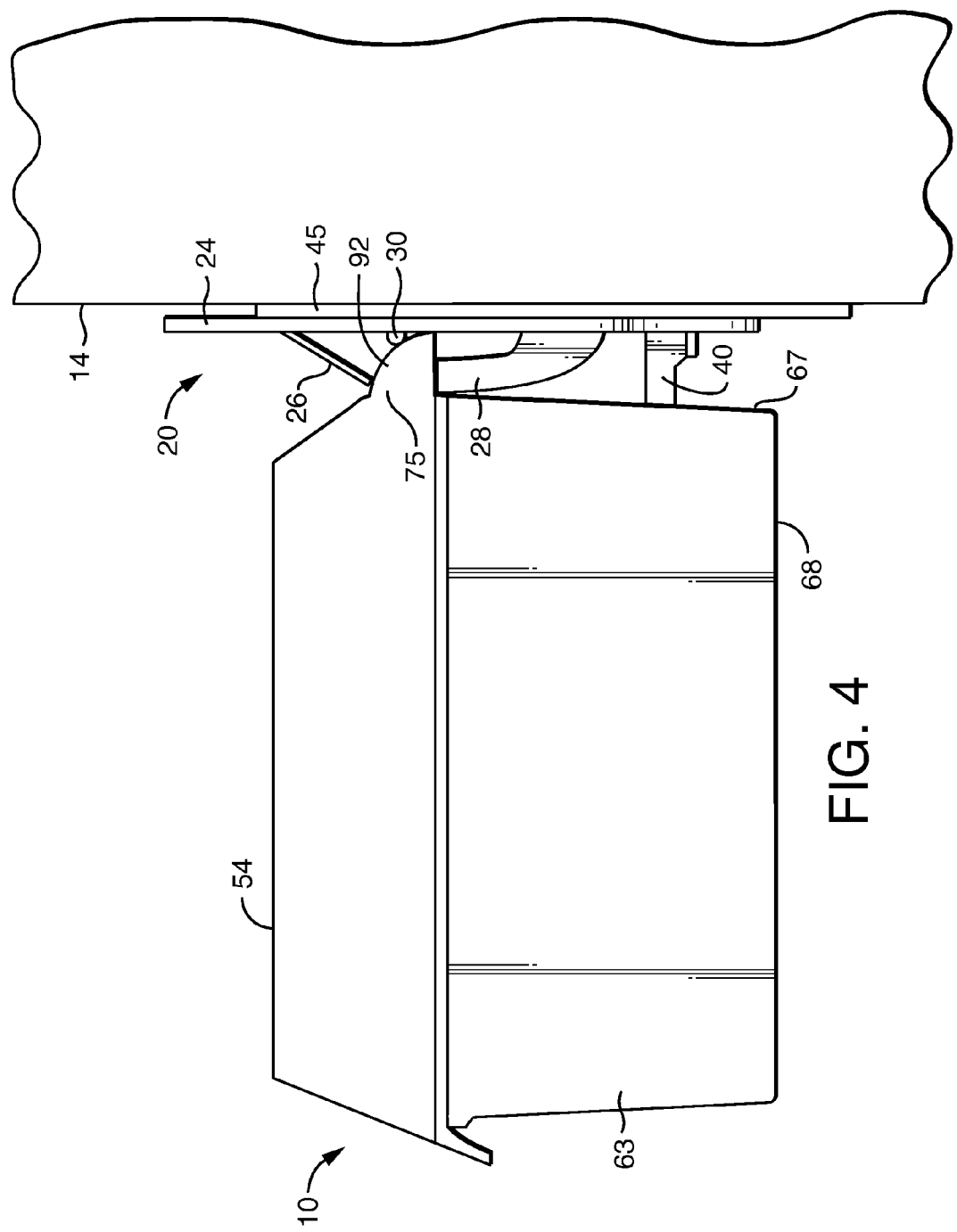

MOUNTING BRACKET AND WALL MOUNTABLE MATERIAL DISPENSING SYSTEM

Pursuant to 35 U.S.C. §120 and/or 35 U.S.C. 119(e), Applicants hereby claim priority from presently U.S. Provisional Application No. 61/229,983 entitled "Mounting Bracket and Wall Mountable Material Dispensing System" filed on Jul. 30, 2009, in the names of Andrew D. Brinkdopke et al.

BACKGROUND

Increasingly, consumers are using wet wipe products in addition to dry bathroom tissue for personal hygiene in the bathroom. However, most toilet paper roll holders are designed only to hold a single roll of dry bathroom tissue. The existing toilet paper roll holders are not designed for supporting a wet wipes dispenser. This can reduce or hinder using wet wipes within the bathroom if they cannot otherwise be located close to the toilet for easy use.

Various devices have been configured to allow for an additional wet wipe dispenser to mount with or adjacent the existing designs for toilet paper roll holders.

One approach is to replace the existing toilet paper spindle in the toilet paper roll holder with a custom dispenser that mounts with the existing spindle holes. The custom dispenser usually has provisions for holding a dry tissue roll and a compartment for dispensing wet wipes. A drawback to this approach is that often the custom designed dispenser is large and/or unsightly. Many people do not like the look of the custom dispensers in the bathroom. Furthermore, the custom dispensers can be expensive. People who are unsure that they will like or use the custom dispenser often will not try the mountable device due to the higher initial cost.

A second approach is to hang the wet wipes dispenser from the existing toilet paper holder by hooking the dispenser to the spindle. A problem with this approach is that refilling the toilet paper roll holder with a new tissue roll is cumbersome since a consumer also has to remove and replace a second dispenser each time the toilet paper roll needs changing. Many consumers do not wish to bother with this annoyance and avoid the wet wipe dispensers with hooks that attach to the spindle.

Consumers who use wet wipes tend to be bifurcated between those desiring to place the wet wipes dispenser near the dry tissue roll and those preferring to place the wet wipes dispenser out of sight or hidden since they would feel embarrassed if other people knew they were using the product. As such, it is desirable that a wet wipes dispenser can be optionally located near the dry toilet paper roll, or suitable for using on flat surfaces instead of hanging, or convenient to hold and dispense the wet wipes.

In view of the above, a need exists for a dispenser that can be located near a paper roll holder. A need also exists for a dispenser than can be used in a horizontal orientation to provide better and more consistent dispensing.

SUMMARY

Generally, a mounting bracket for securing a mountable object to a surface is disclosed. The mounting bracket has a baseplate having a substantially flat mounting surface and an opposite outward-facing surface. At least one ledge extends a first distance from the outward-facing surface of the baseplate to support the mountable object. The mounting bracket includes at least one mounting bracket locking component adapted to frictionally engage a mountable object and locks the mountable object in place. Additionally, the mounting bracket includes at least one stabilizing member extending a second distance from the outward-facing surface, wherein the second distance may be different than the first distance and helps to limit excessive movement of the mountable object during interaction.

Desirably, the mounting bracket may be used with a wall-mountable material dispensing system. The system includes a material dispenser having a side-wall and a dispenser locking component and the mounting bracket. The stabilizing member extends between the outward-facing surface of the mounting bracket and the side-wall of the material dispenser when the dispenser locking component and the mounting bracket locking component are frictionally engaged.

The mounting bracket locking component may include a flexible tab extending from the outward-facing surface towards the ledge and interacting with the dispenser locking component to limit relative movement of the material dispenser and the mounting bracket when the locking components are frictionally engaged. The flexible tab may also be depressed to allow relative movement of the material dispenser and the mounting bracket and remove the dispenser from the bracket.

The system also provides a safety release force so that the material dispenser releases from the mounting bracket when a force of greater than about 1000 grams and less than about 9000 grams is placed against a top or a bottom of the material dispenser.

Desirably, the system may be packaged as a kit wherein the mounting bracket is packaged within the material dispenser. To allow the mounting bracket to fit between the mini-lid and the main lid, the stabilizing member is a foot connected by a living hinge to the baseplate.

BRIEF DESCRIPTION OF THE DRAWINGS

The above aspects and other features, aspects, and advantages of the present invention will become better understood with regard to the following description, appended claims, and accompanying drawings in which:

FIG. 1 is a perspective view illustrating an exemplary mounting bracket for use with a mountable object.

FIG. 2 is a front view illustrating the exemplary mounting bracket.

FIG. 3 is a side view illustrating the exemplary mounting bracket.

FIG. 4 is a side view illustrating an exemplary wall mountable dispensing system.

Figure 5:
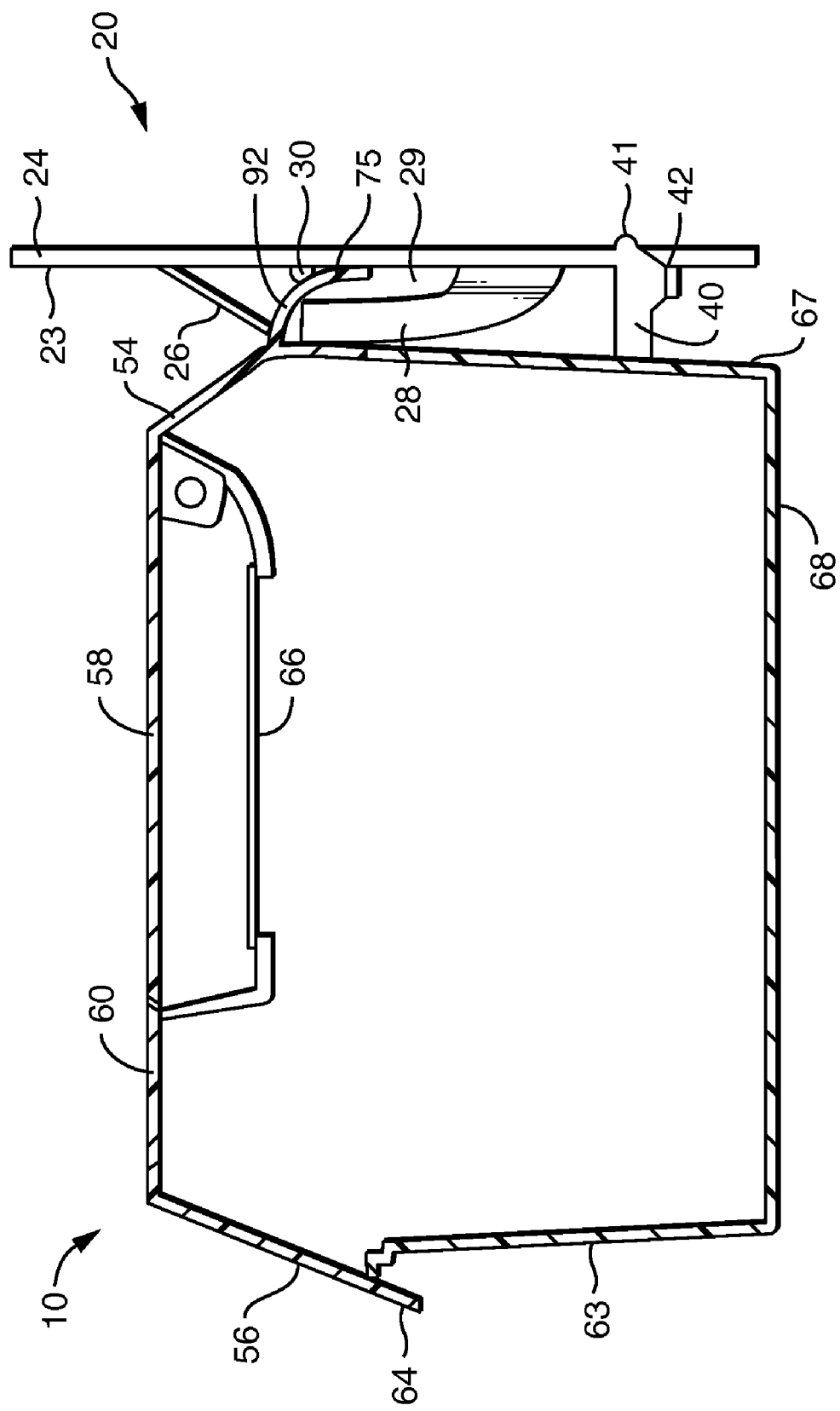
FIG. 5 is a cross-sectional side view illustrating the exemplary wall mountable dispensing system.

Repeated use of reference characters in the specification and drawings is intended to represent the same or analogous features or elements of the invention in different embodiments.

DETAILED DESCRIPTION

It is to be understood by one of ordinary skill in the art that the present discussion is a description of exemplary embodiments only, and is not intended as limiting the broader aspects of the present invention, which broader aspects are embodied in the exemplary construction.

As illustrated in FIGS. 1-3, a mounting bracket 20 for supporting an object on a fixed mounting surface 14 such as a wall is disclosed. The mounting bracket 20 includes a baseplate 22 having a substantially flat mounting surface 21 and an opposite outward-facing surface 23. A least one ledge 28 extends a first distance, D1, from the outward-facing surface 23 and is adapted to support the object when desired to be placed on the mounting surface 14. The Figures illustrate one ledge, but multiple ledges may also be present on the mounting bracket to help support the mountable object at multiple areas.

To maintain the object on the mounting bracket 20, a mounting bracket locking component 32 is adapted to frictionally engage the mountable device. The mounting bracket locking component 32 frictionally engages with a portion of a mountable device to prevent relative movement of the mountable device with regard to the mounting bracket 20. The Figures illustrate one mounting bracket locking component, but multiple mounting bracket locking components may also be present on the mounting bracket to help lock the mountable object onto the mounting bracket at multiple locations.

The mounting bracket locking component 32 may be in a latch-catch relationship with a mountable device to provide the frictional engagement. For example, as illustrated in FIGS. 1-3, the ledge 28 is spaced from and extends over a portion of the outward-facing surface 23 to define a slot. Within this slot 29 may be at least one projection 30 extending from the outward facing surface 23 defining an engagement area between the ledge 28 and the outward-facing surface 23. A portion of the mountable object may be frictionally engaged between the projection 30 and ledge 28 to limit movement of the mountable object.

In other exemplary embodiments, the mounting bracket locking component 32 may include a flexible tab 26 extending from the outward-facing surface 23 towards the ledge 28 to provide an engagement area to accommodate a portion of the mountable object. When attached to the mounting bracket 20, the portion of the mountable object will be frictionally engaged between the flexible tab 26 and the ledge 28. The frictional engagement between the flexible tab 26, the ledge 28 and the portion of the mountable object will limit relative movement of the mountable object and the mounting bracket 20.

The flexible tab 26 may also be depressed to allow relative movement of the mountable object and the mounting bracket 20. Thus, the flexible tab 26 may be depressed by a user, and the mountable object may be removed from the mounting bracket 20 and the mounting surface 14.

In still other exemplary mounting brackets, the mounting bracket locking component 32 comprises both a flexible tab 26 and an engagement area defined by the slot 29 and at least one projection 30 extending from the outward facing surface 23 provided between the ledge 28 and the outward-facing surface 23. This provides multiple areas of frictional engagement between the mountable device and the mounting bracket 20 providing a more securely mounted object.

The mounting bracket 20 also includes a stabilizing member 40. The stabilizing member 40 extends a second distance, D2, from the outward-facing surface 23 and is adapted to contact the mountable object when the mountable object is frictionally engaged with the locking component. Desirably, the stabilizing member 40 extends a distance from the outward-facing surface 23 that holds the mountable object in a stable position against the mounting bracket. Thus D2 may be equal to, greater than, or smaller than the distance, D1, that the ledge 28 extends from the outward-facing surface 23 depending on the shape of the mountable object. Typically, the portion of the mountable object engaged with the mounting bracket locking component 32 extends away from the side of the object to create an area for mating with the mounting bracket locking component 32. Thus, when a force is placed on the object, the object may move relative to the mounting surface, for example, rotating about the locking components. The stabilizing member 40 extends from the mounting bracket 20 a distance farther than the mounting bracket locking component 32 to make contact with another portion of the mountable object. This allows the stabilizing member 40 to limit movement of the mountable object relative to the mounting bracket 20 and prevent rotation of the material dispenser 10 about the locking components. The Figures illustrate one stabilizing member, but multiple stabilizing members may also be present on the mounting bracket to help secure the mountable object in place at multiple locations.

A variety of attachment members 45 are suitable to affix the mounting bracket 20 to the fixed mounting surface 14. The mounting bracket 20 may be secured to the fixed mounting surface 14 with an attachment member 45 selected from adhesives, hook and loop tapes, suction cups, magnets, screws, removable double-sided foam, other tapes, micro suction, and static cling films.

Desirably, the attachment member 45 is a stretch release adhesive 47. To affix the mounting bracket to the fixed mounting surface with a stretch release adhesive 47, a first protective layer is removed from the stretch release adhesive 47 to expose a first adhesive layer. The first adhesive layer 47 is placed onto the substantially flat mounting surface 21 of the mounting bracket 20 to adhere the mounting bracket to the stretch release adhesive. Alternatively, the mounting bracket 20 may be supplied with the stretch release adhesive 47 already attached.

A second protective layer is then removed from the opposing side of the stretch release adhesive 47 to expose a second adhesive layer. The second adhesive layer placed onto the mounting surface 14 to adhesively attach the stretch release adhesive 47 and the mounting bracket 20 to the mounting surface 14. The stretch release adhesive 47 includes a stretch release tab 48 extending from the mounting bracket 20 when mounted. When desired the stretch release tab 48 is pulled and the second adhesive layer is released from the mounting surface 14. As such, the mounting bracket 20 may be removed permanently from the mounting surface 14 without causing damage to the mounting surface 14 and placed elsewhere using another attachment member 45.

Figure 6:
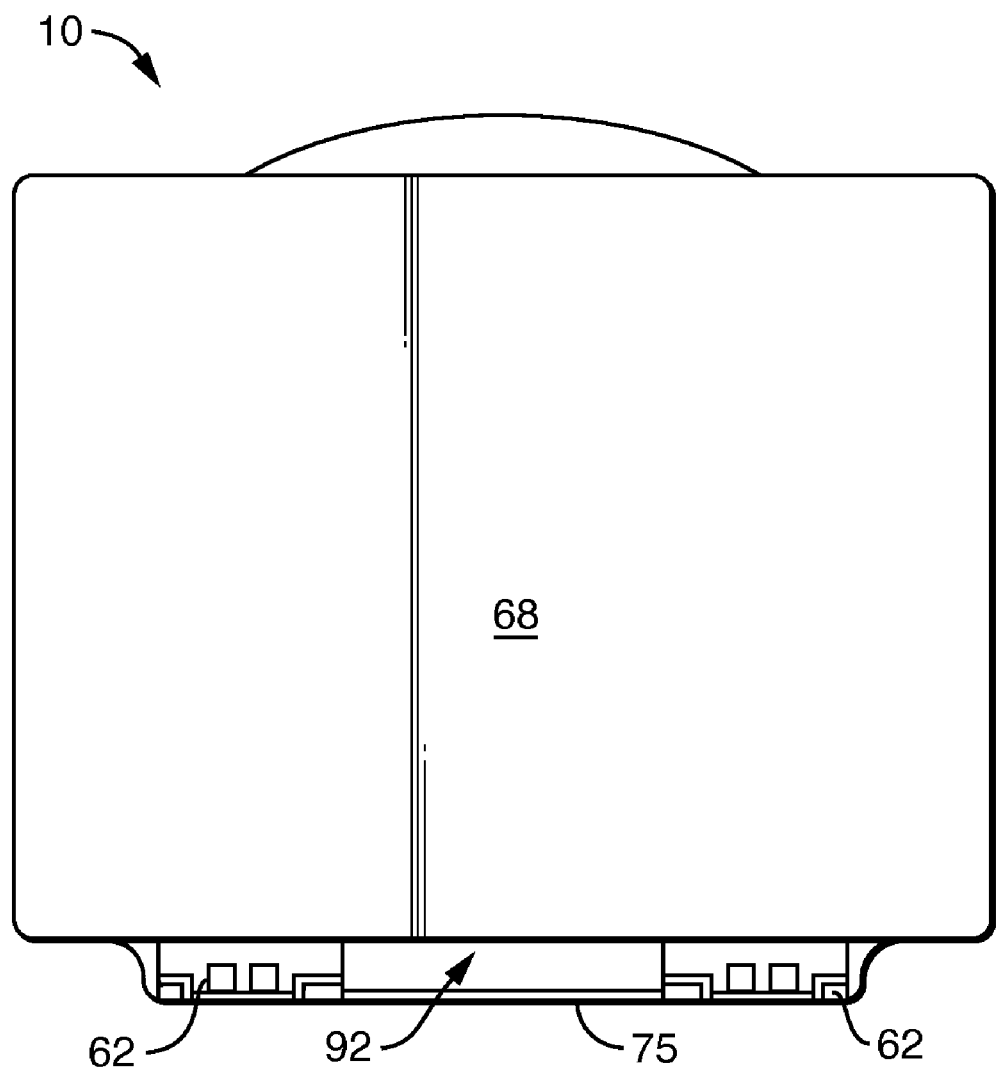
FIG. 6 is a bottom view of the material dispenser illustrating an exemplary dispenser locking component.

As illustrated in FIGS. 4-6, the mounting bracket 20 may be used to support a material dispenser 10 on a wall or mounting surface 14. Exemplary materials for use with the dispenser are flexible substrates, which are useful for household chores, cleaning, personal care, health care, food wrapping, and cosmetic application or removal. Non-limiting examples of suitable substrates for use with the material dispenser include nonwoven substrates; woven substrates; hydro-entangled substrates; air-entangled substrates; paper substrates comprising cellulose such as tissue paper, toilet paper, or paper towels; waxed paper substrates; coform substrates comprising cellulose fibers and polymer fibers; wet substrates such as wet wipes, moist cleaning wipes, moist toilet paper wipes, and baby wipes; film or plastic substrates such as those used to wrap food; shop towels; and metal substrates such as aluminum foil. Furthermore, laminated or plied together substrates of two or more layers of any of the preceding substrates are also suitable.

Desirably, the material substrates that are either wet or pre-moistened by an appropriate liquid, partially moistened by an appropriate liquid, or substrates that are initially dry but intended to be moistened prior to use by placing the substrate into an appropriate liquid such as water or a solvent. Non-limiting examples of suitable wet substrates include a substantially dry substrate (less than 10% by weight of water) containing lathering surfactants and conditioning agents either impregnated into or applied to the substrate such that wetting of the substrate with water prior to use yields a personal cleansing mountable device.

The mounting bracket 20 can be used with many different kinds of material dispensers 10, but desirably the material dispenser is designed to house a plurality of individual sheets that are pre-moistened with a cleansing solution to function as wet wipes. Referring now to FIGS. 4 and 5, the material dispenser 10 can include a top 54, the bottom 68, and the side wall 67. Desirably, the top 54 includes a main-lid 56, a mini-lid 58, a push button 60, and a dispensing orifice. The side wall 67 and the bottom 68 form a lower tub 63 of the material dispenser 10. The main-lid 56 can be hingably attached to the side wall 67 by a pair of hinges 62. The main-lid 56 is secured in the closed position by a latch 64. When the latch 64 is unfastened, the main-lid 56 can be opened to expose the entire top of the tub 63 to replenish the material dispenser 10 with new wet wipes.

To dispense a wet wipe from the material dispenser 10, the push button 60 is depressed and a biasing spring rotates the mini-lid 58 to an open position, thereby exposing an exposed portion of the wet wipe. The rear edge of the mini-lid 58 can includes a pair of posts or projections that mate with a pair of apertures in the main-lid 56 for rotational movement. Desirably, the sheets forming the wet wipes are folded, perforated, interfolded, or interrelated such that withdrawing one wipe partially withdraws a portion of the next sheet.

The material dispenser 10 can be co-molded from two different materials such as a hard plastic and a softer thermoplastic elastomer material. As such, sealing areas between the main-lid 56 and tub 63, and/or between the mini-lid 58 and main-lid 56 can have a gasket formed by the thermoplastic elastomer material if desired to enhance moisture retention of the material dispenser 10. The push button 60 can be co-molded with the sides of the push button 60 formed from thermoplastic elastomer material for easier use.

The dispensing orifice can be formed as a slit in a dispensing panel 66 located beneath the mini-lid 58 that is formed from flexible or elastic material. The narrow slit in the dispensing panel 66 can help to retain moisture in the material dispenser 10, securely hold the exposed portion of the wet wipe in place and make it easier to reach into the material dispenser to retrieve the next wipe should the pop-up functionality fail since the elastomeric or flexible material can be readily deformed and then spring back into shape.

The dispensing panel 66 can be a flexible rubber-like sheet, the relevant material properties can be described in terms of the hardness, stiffness, thickness, elasticity, specific gravity, compression set, and any combination thereof. More specifically, the Shore A hardness (as measured by ASTM D2240) of the flexible, rubber-like sheet or material can be about 100 or less, more specifically from about 20 to about 90, and still more specifically from about 40 to about 80, and yet more specifically from about 60 to about 70 Shore A. The Gurley stiffness of the flexible, rubber-like sheet or material (as measured by ASTM D6125-97 "Standard Test Method for Bending Resistance of Paper and Paperboard") can be about 10,000 milligrams of force (mgf) or less, more specifically from about 100 to about 8000 mgf, more specifically from about 200 to about 6500 mgf, and still more specifically from about 300 to about 1500 mgf. The thickness of the flexible, rubber-like sheet can be about 10 mil or greater, more specifically from about 10 mil to about 110 mil, and still more specifically from about 35 mil to about 60 mil. The elasticity of the flexible rubber-like material or sheet, as characterized by the tensile stress at 100 percent elongation and measured in accordance with ASTM D412 "Standard Test Methods for Vulcanized Rubber and thermoplastic elastomers", can be about 10 megapascals (MPa) or less, more specifically from about 0.1 to about 7 MPa, and still more specifically from about 0.5 to about 2.5 MPa. The flexible rubber-like sheet can have a specific gravity (per ASTM D792) of about 0.80 to 1.21, more specifically 0.88 to about 1.10, and still more specifically from about 0.90 to about 1.0. The flexible rubber-like sheet can have a compression set (per ASTM 395B) of (at room temperature/at 70° F.) about 8/30 to 40/120 and more specifically 15/45 to about 28/100.

An example of suitable dispensing panel materials includes thermoplastic elastomeric materials that can be used to provide acceptable dispensing. Materials which can be employed include (but are not limited to): any of the family of styrenic-based thermoplastic elastomers (i.e. styrenic block copolymer compounds); styrenic-based thermoplastic elastomers containing rubber modifiers such as Kraton®, Santoprene®, or other rubber modifiers; Kraton®; Santoprene®; specialty copolymers, such as ethylene-methyl acrylate copolymers (e.g. EMAC® of the Eastman Chemical Company); thermoset rubbers; polyurethane; alloys; amides; engineering thermoplastic elastomers; olefinic-based; olefinic vulcanizates; polyester-based; polyurethane-based. One such material for the flexible dispensing panel could be that manufactured by the GLS-Corporation of McHenry, Ill. and known as resin #G2701. The G2701 material is one of the resins in the mountable device family of thermoplastic elastomers. G2701 is a styrenic-based material and is in the family of Styrenic block copolymer compounds. Some particular properties of the G2701 can be: specific gravity of 0.090 g/cc (per ASTM D792); hardness (Shore A durometer) of 68 (ASTM D2240); and compression set of 24% at room temperature, 96% at 70° F. (per ASTM 395B). Another similar material is known as G2755 and also sold by GLS Corporation. In addition, a lubricant (e.g., wax) can be added to lower the coefficient of friction of the continuous slit which can benefit injection molding, wet wipes dispensing, and physical handling of the flexible orifice. The G2701 thermoplastic elastomer resin with 0.25% wax additive sold by GLS Corporation and known as #LC217-189 can be used.

FIGS. 4 and 5 illustrate an exemplary wall mountable material dispensing system. The wall mountable material dispensing system includes a material dispenser 10 and the mounting bracket 20 described herein. The mounting bracket 20 may be attached to a mounting surface 14 with an attachment member 45 as described above. Then a material dispenser 10 having a side wall 67 and a dispenser locking component 75 may be mounted onto the mounting bracket 20.

The dispenser locking component 75 may be a portion of the wipe dispenser that is adapted to frictionally engage the bracket locking component 32. In one exemplary dispensing system, the dispenser locking component 75 is a latch defined by a proud region 92 of the top 54 of the material dispenser 10 between the two hinges 62. Other dispenser locking components may also be used. For example, the dispenser locking component may include, but not limited to, a latch formed in the side wall 67 of the dispenser or a separate bracket attached to the side wall 67 of the dispenser. The dispenser locking component 75 may also be a latch formed into or extending out from the material dispenser 10.

Additionally, the dispenser locking component 75 may be a flexible tab attached to the material dispenser and extending between the material dispenser 10 and the mounting bracket 20. This flexible tab may also act as a release point for the material dispenser when a user wants to remove the material dispenser 10 from the mounting surface 14. When the user wants to remove the material dispenser from the mounting bracket 20, a user depresses the flexible tab and pulls the dispenser up and off the mounting bracket 20.

In the exemplary wall mountable material dispensing system illustrated in FIGS. 4 and 5, the proud region 92 of the top of the material dispenser fits into the slot 29 between the ledge 28 and outward-facing surface 23 of the baseplate 22 by contacting both the ledge 28 and the projections 30 extending from the outward-facing surface 23. The ledge 28 acts a as ridge that supports the weight of the material dispenser 10.

As illustrated, the flexible tab 26 also acts as a mounting bracket locking component 32. The flexible tab 26 limits relative movement of the material dispenser 10 and the mounting bracket by making contact with the top of the proud region 92 between the hinges 62 of the top 54 of the material dispenser 10 and providing a frictional engagement with the ledge 28. This provides a more securely mounted material dispenser as multiple points of the mounting bracket engage the material dispenser.

The flexible tab 26 may also act as a release point for the material dispenser 10 when a user wants to remove the material dispenser 10 from the mounting surface 14. When the user wants to remove the material dispenser from the mounting bracket 20, a user depresses the flexible tab 26 and pulls the dispenser up and off the mounting bracket 20.

Furthermore, a stabilizing member 40 extends between the outward-facing surface and the side-wall 67 of the material dispenser 10 when the dispenser locking component and the mounting bracket locking component are frictionally engaged to help limit movement of the material dispenser during use. As illustrated in the Figures, a stabilizing member 40 extends from the outward-facing surface 23 of the mounting bracket and is adapted to contact the side-wall 67 when the locking components are frictionally engaged. The stabilizing member may also extend from the side-wall of the material dispenser to make contact with the outward-facing surface of the mounting bracket 20.

The dispensing system may optionally include an extended area 24 extending from the backplate 22 of the mounting bracket that extends high enough above the material dispenser 10 so that a user will see the extended area. This provides the user with a perception of stability, and prevents the user from the perception that the material dispenser is "floating" on the mounting surface.

To prevent damage to the mounting surface 14 from forces applied either from the top (as a shelf or level) or accidentally from the bottom of the material dispenser 10, the system incorporates a safety release mechanism which allows the material dispenser 10 to detach from the bracket 20 prior to damaging the mounting surface. When an extreme force is applied in either the upwards or downwards direction, the material dispenser 10 releases from the bracket 20 either by simply popping off or by separating, but not breaking the proud region between the hinges 62 of the material dispenser 10. When a significant force is applied upward on the bottom of the tub, the flexible tab will depress and the material dispenser will release from the mounting bracket. When a significant force is applied downward on the top of the tub, the proud region of the top of the material dispenser will break away from the mounting bracket locking component and the dispenser will release from the mounting bracket. Typical use forces for the tub, for example, dispensing, push button opening, closing the lid are below 1000 grams-force.

Therefore, the material dispensing system has a safety release, i.e. the material dispenser releases from the mounting bracket 20, when a force of greater than about 1000 grams and less than about 9000 grams is placed against a top or a bottom of the material dispenser. More specifically, the material dispensing system has a safety release, i.e. the material dispenser 10 releases from the mounting bracket 20, when a force of greater than about 1000 grams and less than about 5000 grams is placed against of a top or a bottom of the material dispenser.

Testing was completed to illustrate the different forces required for normal use including dispensing, closing the lid, and pushing the button, forces required to cause drywall damage caused by a hanging object, and the forced caused for a safety release of the bracket from the wall. The following test procedures indicate how the forces were measured. For testing, a COTTONELLE FRESH® Flushable Moist Wipes dispenser (commercially available from Kimberly-Clark Corporation, Dallas, Tex.) is used as the material dispenser.

Test Stand Information:
1. MTS Insight electromechanical-1 kN standard length (MTS system number 5500942)
2. 100N capacity MTS load cell (Model number 569326-05, Serial number 626182)
3. Test platform—Button Pushing, Lid Closing, Wipe Dispensing
4. Test probe (0.25" diameter, 2.5" length)
5. Test clamp (4.125" wide)

Test Procedure for Normal Use Forces:
Button Pushing (All Test Locations on Button):
1. Insert and secure one material dispenser tub filled with 42 moist wipes on the test platform.
2. Adjust material dispenser so that the probe makes contact with the button at the desired test point (center middle, center front, left, and right button locations were tested).
3. Raise probe to 5 mm above the surface of the button.
4. Initiate test with probe speed of 1000 mm/min.

Wipe Dispensing:
1. Insert and secure one tub filled with 42 moist wipes on the test platform.
2. Adjust so that the test clamp grabs the wipe and pulls straight up perpendicular to the top of the tub.
3. Initiate test with probe speed of 1000 mm/min.

Wipe Dispensing (Angle):
1. Insert and secure one material dispenser filled with 4 flushable moist wipes on the test platform.
2. Adjust so that the upper grips make the wipe pull straight up perpendicular to the top of the material dispenser.
3. Adjust the test platform until it is at an angle of 22.5°.
4. Test per above wipe dispensing procedure.

Mini Lid Closing:
1. Insert and secure one material dispenser filled with moist wipes on the test platform.
2. Adjust so that the pointer makes contact with the lid in the center of the fresh symbol on the material dispenser.
3. Raise pointer to 10 mm above the surface of the lid.
4. Press the button to open the mini lid.
5. Initiate test with probe speed of 1500 mm/min.

Test Preparation for Bracket Testing:
Drywall Preparation:
1. ⅝ inch (15.9 mm) thick gypsum drywall board
2. Drywall cut into 7.5 inch×10 inch sections
3. Drywall primed with BEHR new dry wall primer and seal
4. Primer dried for 4 hours 5. Drywall painted with BEHR semi-gloss interior ultra pure white
6. Paint allowed to dry overnight Test Assembly Set-Up:
1. Prepare a simulated wall using a 14" tall×3" long steel L-bracket (¼" thick), 12"×7.125" sheet of clear poly carbonate (³⁄₁₆" thick for stability of wall in test fixture), and a piece of drywall using clamps to hold the pieces securely together. Attach the simulated wall to the test frame.
2. Apply the red side of two medium size stretch adhesive tape (3M Command® Adhesive commercially available from 3M Company, St. Paul, Minn.) to the flat plane on the mounting bracket, press for at least 10 seconds.

Test Procedure for Safety Release Forces:
Downward Center Force:
1. Apply the black side of the stretch adhesive tape to the drywall so the foot of the mounting bracket is at the bottom of the bracket.
2. Hold mounting bracket on the wall for at least 10 seconds.
3. Attach one material dispenser filled with moist wipes on the mounting bracket.
4. Adjust so that the probe makes contact with the lid in the center of the fresh symbol on the material dispenser.
5. Raise pointer to 5 mm above the surface of the lid.
6. Initiate test with a probe speed of 1500 mm/min.
7. Force recorded at point when tub pops off bracket.

Upward Center Force:
1. Apply the black side of the stretch release adhesive to the drywall so the foot of the mounting bracket is at the top (bracket upside down).
2. Hold mounting bracket on the wall for at least 10 seconds.
3. Place one material dispenser filled with moist wipes on the mounting bracket upside down.
4. Adjust so that the pointer makes contact with the bottom of the material dispenser 3" from the back of the tub in the center.
5. Raise pointer to 5 mm above the surface of the lid.
6. Raise pointer to 5 mm above the surface of the lid.
7. Initiate test with a probe speed of 1500 mm/min.
8. Force recorded at point when tub pops off bracket.

Test Procedure for Drywall Failure Force
Solid Test Surface Set-Up:
1. Prepare a simulated "device" using a 4" tall×2.5" long aluminum L-bracket (⅛" thick) and a 6.75"×5.125" piece of wood.
2. Apply the red side of two medium size stretch release adhesive strips (3M Command® Adhesive commercially available from 3M Company, St. Paul, Minn.) to the flat plane on the aluminum L-bracket with the same spacing that is on the mounting bracket of 1.5 inches and hold the on for at least 10 seconds
3. Apply the black side of the 3-M adhesive tape to the drywall so the position is the same (relative to the test equipment) as the bracket and tub were.
4. Hold L-bracket on the wall for at least 10 seconds
5. Raise pointer to 5 mm above the surface of the lid
6. Initiate test with a probe speed of 1500 mm/min
7. Force recorded at point the rigid body separates from drywall The above tests were completed at least 7 times and the results averaged to determine the average force placed on the material dispenser for normal use, safety release forces from the mounting bracket, and drywall damage. The average forces are illustrated below in Table 1. As seen in the figures, all normal use forces placed on the material dispenser are less than 1000 grams-force and damage is caused to drywall when 9267 grams force is placed on the dispenser using a bracket that does not have a safety release. Using the exemplary wall mountable dispensing system, forces may be placed on the bottom or tub of the tub that still allow normal use, but prevent damage by causing a safety release of the material dispenser from the mounting bracket.

TABLE 1

Safety Release Force Values

| Force Applied | Average (grams-force) |
|---|---|
| Normal Use (Down) - Button Push #1 | 708 |
| Normal Use (Down) - Button Push #2 | 710 |
| Normal Use (Down) - Button Push #3 | 617 |
| Normal Use (Down) - Button Push #4 | 620 |
| Normal Use (Down) - Lid Closing (Mini) | 697 |
| Normal Use (Up) - Wipe Dispensing | 363 |
| Normal Use (Up) - Wipe Dispensing (22.5 Angle) | 324 |
| Safety Release (Down) | 4419 |
| Safety Release (Up) | 1733 |
| Drywall Damage | 9267 |

Desirably, the wall mountable material sheet dispenser is sold as a kit 100 having both a material dispenser 10 and a mounting bracket 20 for securing the material dispenser 10 against a mounting surface 14. The mounting bracket 20 is sized to allow packaging the mounting bracket 20 within the material dispenser 10.

As described above, the material dispenser may include comprises a bottom 63, a top 54, the top including a main-lid 56, a mini-lid 53, and a dispensing panel 66. Desirably, the mounting bracket 20 is packaged within the material dispenser 10 at a position between the mini-lid 53 and the dispensing panel 66. This helps to minimize the risk of contamination of the materials inside, and provides a convenient location for packaging.

Figure 7:
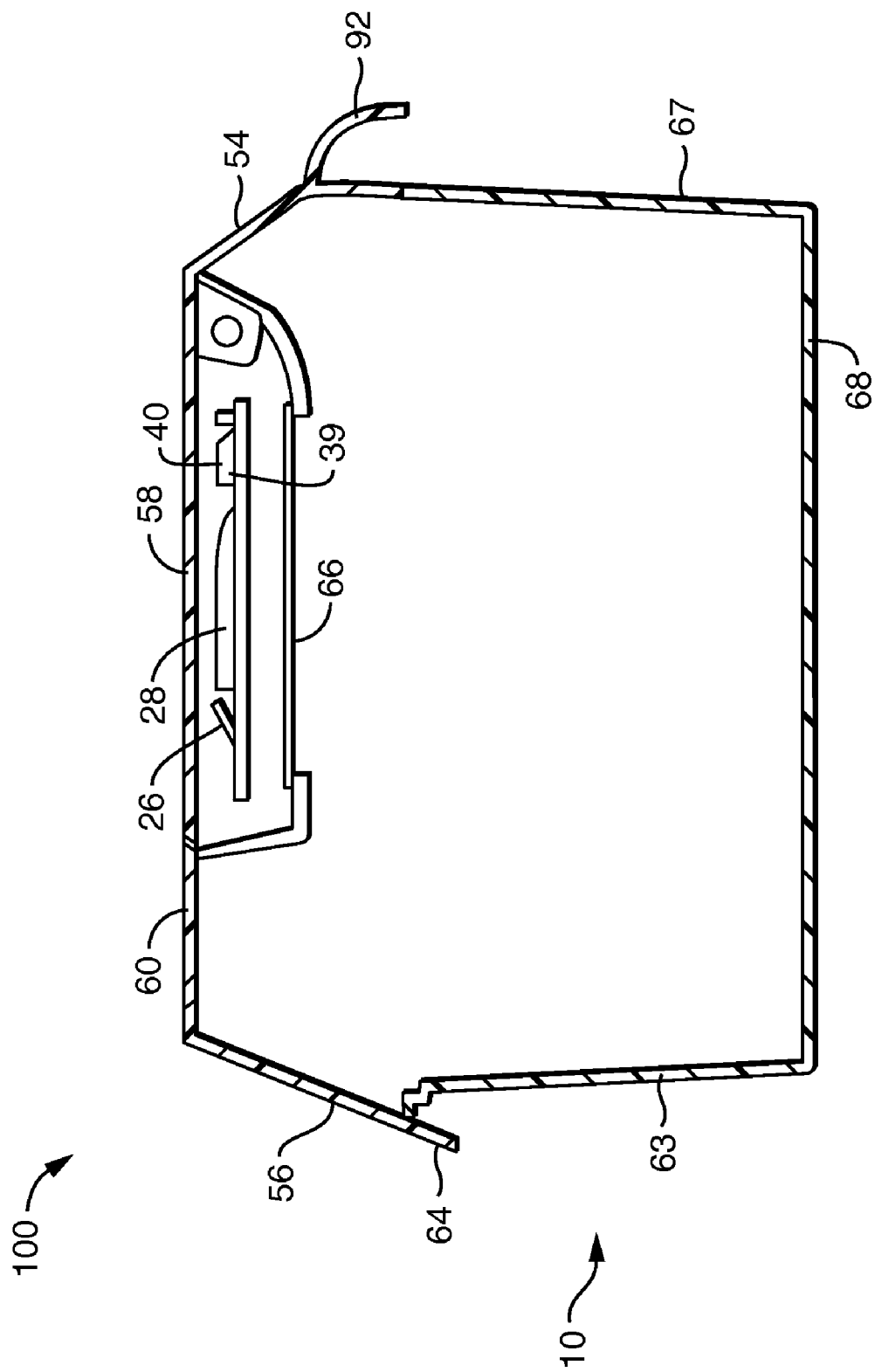
FIG. 7 is a cross-sectional side view illustrating a kit for the exemplary wall mountable dispensing system.

To allow the mounting bracket 20 to fit between the mini-lid 53 and the dispensing panel 66, the stabilizing member 40 may be a foot 39 connected by a living hinge 42 to the baseplate 22. When packaged, the foot 39 is in a position extending parallel to the baseplate 22 as illustrated in FIG. 7 so that the mounting bracket 20 may be packaged within the material dispenser 10 in a narrow cavity between the mini-lid 53 and a dispensing panel 66. If the foot 39 was in the fully extended position, the foot 39 may be rotated forward about the living hinge 42 and includes a latch 44 to mate with a catch 46 in the baseplate 22 to lock the foot 39 in a position extending perpendicular to the baseplate 22 and contacting the side wall 67 of the material dispenser 10 to provide the stabilizing function of the foot 39.

The foot 39 may include a rounded portion 41 extending away from the substantially flat mounting surface of the baseplate 22. When the substantially flat mounting surface of the baseplate 22 is placed against a surface 14, the rounded portion 41 of the foot 39 contacts the surface, and rolls along the surface about the rounded portion 41. This causes the foot 39 to rotate forward about the living hinge to the position extending perpendicular to the baseplate, locking the foot 39 inplace. Thus, the foot 39 is automatically extended when placed against a surface, providing an easy to use mounting bracket 20.

Further, a variety of dispenser attachment orientations is possible, such as, for example, on a wall, with the longer dispenser dimension oriented either horizontally, vertically or slanted relative to the ground. The mounting bracket could also be mounted so that the dispensing orifice is "upside down", i.e., under an overhead kitchen cabinet. Desirably, the dispenser may be mounted in a horizontal position with the dispensing aperture oriented perpendicular to the mounting surface, such that the wipes are dispensing in a parallel orientation to the mounting surface.

Horizontal orientation as illustrated in FIGS. 4 and 5 is desired due to the difficulties dispensing a pop-up wipe in the vertical orientation. Dispensing failure rates are typically between 50-60 percent in the vertical orientation versus the horizontal orientation failure level of under 15-20 percent. Thus, providing a mounting bracket that allows a horizontal orientation allows for better dispensing of the material.

The mounting bracket 20 in the preceding embodiments has been shown in combination with a material dispenser 10 and intended for wet wipes and co-located near a dry toilet paper roll. However, the material dispenser 10 and the mounting bracket 20 can be used adjacent a paper towel holder for kitchen applications.

Other modifications and variations to the present invention may be practiced by those of ordinary skill in the art without departing from the spirit and scope of the present invention, which is more particularly set forth in the appended claims. It is understood that aspects of the various embodiments may be interchanged in whole or part. The preceding description, given by way of example in order to enable one of ordinary skill in the art to practice the claimed invention, is not to be construed as limiting the scope of the invention, which is defined by the claims and all equivalents thereto.

What is claimed is:

1. A wall-mountable material dispensing system comprising:
    a material dispenser having a side-wall, a dispensing aperture, and a dispenser locking component; and
    a mounting bracket including:
        a baseplate having a substantially flat mounting surface and an opposite outward-facing surface,
        at least one ledge extending from the outward-facing surface,
        at least one mounting bracket locking component adapted to frictionally engage the dispenser locking component, and
        at least one stabilizing member extending between the outward-facing surface and the side-wall of the material dispenser when the dispenser locking component and the mounting bracket locking component are frictionally engaged,
    wherein the material dispenser is in a horizontal orientation when mounted on the wall, such that the dispensing aperture is oriented perpendicular to the baseplate mounting surface.

2. The wall-mountable material dispensing system of claim 1 further comprising a flexible tab extending from the outward-facing surface, the flexible tab limiting relative movement of the material dispenser and the mounting bracket when the locking components are frictionally engaged.

3. The wall-mountable material dispensing system of claim 2 wherein the flexible tab may be depressed to allow relative movement of the material dispenser and the mounting bracket.

4. The wall-mountable material dispensing system of claim 1 wherein the material dispenser releases from the mounting bracket when a force of greater than about 1000 grams and less than about 9000 grams is placed against a top or a bottom of the material dispenser.

5. The wall-mountable material dispensing system of claim 1 wherein the material dispenser releases from the mounting bracket when a force of greater than about 1000 grams and less than about 5000 grams is placed against of a top or a bottom of the material dispenser.

6. The wall-mountable material dispensing system of claim 1 wherein the mounting bracket is adapted to be attached to a wall with an attachment member selected from hook and loop tapes, suction cups, magnets, screws, removable double-sided foam, other tapes, micro suction, static cling films.

7. The wall-mountable material dispensing system of claim 1 wherein the mounting bracket is adapted to be attached to a wall with a stretch removable adhesive.

8. The wall-mountable material dispensing system of claim 1 wherein the mounting bracket locking component is an engagement area defined between a protrusion on the baseplate and the ledge.

9. The wall-mountable material dispensing system of claim 1 wherein the material dispenser further comprises a bottom, a top, the top including a main-lid, a mini-lid, a push button, and a dispensing panel, wherein the bottom and top are connected by two hinges, the top defining a first edge and a second edge opposite and substantially parallel to the first edge, the two hinges positioned on the first edge;
    wherein the dispenser locking component is defined by a proud region of the top of the material dispenser positioned on the first edge between the two hinges.

10. A wall-mountable material dispensing system comprising:
    a material dispenser having a side-wall and a dispenser locking component; and
    a mounting bracket including:
        a baseplate having a substantially flat mounting surface and an opposite outward-facing surface,
        at least one ledge extending from the outward-facing surface,
        at least one mounting bracket locking component adapted to frictionally engage the dispenser locking component,
        at least one stabilizing member extending between the outward-facing surface and the side-wall of the material dispenser when the dispenser locking component and the mounting bracket locking component are frictionally engaged; and
        a flexible tab extending from the baseplate and contacting the top of the dispenser locking component that depresses when a force is placed against the center of the bottom of the tub.

11. A wall-mountable material dispensing system comprising:
    a material dispenser having a side-wall and a dispenser locking component; and
    a mounting bracket including:
        a baseplate having a substantially flat mounting surface and an opposite outward-facing surface,
        at least one ledge extending from the outward-facing surface,
        at least one mounting bracket locking component adapted to frictionally engage the dispenser locking component, and
        at least one stabilizing member extending between the outward-facing surface and the side-wall of the material dispenser when the dispenser locking component and the mounting bracket locking component are frictionally engaged,
    wherein the stabilizing member is a foot contacting a side wall of the material dispenser, the foot connected by a living hinge to the baseplate and includes a latch to mate with a catch in the baseplate to lock the foot in a position extending perpendicular to the baseplate; and wherein the foot includes a rounded portion extending from the substantially flat mounting surface to cause the foot to rotate forward to the position extending perpendicular to the baseplate when the mounting bracket is placed against a wall.

12. The wall-mountable material dispensing system of claim 11 wherein the foot is in a position extending parallel to the baseplate and the mounting bracket may be packaged within the material dispenser between a mini-lid and a dispensing panel.

13. A kit comprising:
a material dispenser; and
a mounting bracket having a substantially flat mounting surface and an opposite outward-facing surface,
wherein the mounting bracket is packaged within the material dispenser, and
wherein the mounting bracket further comprises:
a baseplate for placement against a mounting surface,
at least one ledge extending from the baseplate,
at least one mounting bracket locking component that engages with a material dispenser locking component, and
at least one stabilizing member extending from the baseplate for contacting a side-wall of the material dispenser.

14. The kit of claim 13, wherein the stabilizing member is a foot, and wherein the foot is connected by a living hinge to the baseplate, and wherein the foot includes a latch to mate with a catch in the baseplate to lock the foot in a position extending perpendicular to the baseplate.

15. The kit of claim 14, wherein the stabilizing member is a foot, and wherein the material dispenser further comprises a bottom, a top, the top including a main-lid, a mini-lid, and a dispensing panel; and wherein the foot is in a position extending parallel to the baseplate and the mounting bracket may be packaged within the material dispenser between a mini-lid and a dispensing panel.

16. The kit of claim 14, wherein the stabilizing member is a foot, and wherein the foot includes a rounded portion extending from the substantially flat mounting surface to cause the foot to rotate forward to the position extending perpendicular to the baseplate when the mounting bracket is placed against a wall.

* * * * *